United States Patent
Urata et al.

(10) Patent No.: US 9,994,269 B1
(45) Date of Patent: Jun. 12, 2018

(54) ROTATABLE EXTENSION FOR ROBOT FOOT

(71) Applicant: X Development LLC, Mountain View, CA (US)

(72) Inventors: Junichi Urata, Tokyo (JP); Yoshito Ito, Tokyo (JP)

(73) Assignee: Schaft Inc., Tokyo (JP)

( * ) Notice: Subject to any disclaimer, the term of this patent is extended or adjusted under 35 U.S.C. 154(b) by 119 days.

(21) Appl. No.: 14/939,087

(22) Filed: Nov. 12, 2015

(51) Int. Cl.
*B62D 57/02* (2006.01)
*B62D 57/032* (2006.01)

(52) U.S. Cl.
CPC ........... *B62D 57/02* (2013.01); *B62D 57/032* (2013.01); *Y10S 901/01* (2013.01)

(58) Field of Classification Search
CPC ...... B62D 57/02; B62D 57/032; Y10S 901/01
See application file for complete search history.

(56) References Cited

U.S. PATENT DOCUMENTS

| | | | |
|---|---|---|---|
| 4,892,554 A * | 1/1990 | Robinson | A61F 2/66 623/55 |
| 5,127,484 A | 6/1992 | Bares et al. | |
| 5,416,393 A * | 5/1995 | Gomi | B62D 57/032 180/8.1 |
| 5,421,426 A | 6/1995 | De Beaucourt et al. | |
| 5,455,497 A * | 10/1995 | Hirose | B62D 57/032 180/8.1 |
| 5,551,525 A | 9/1996 | Packe et al. | |
| 5,695,527 A * | 12/1997 | Allen | A61F 2/66 623/52 |
| 5,807,011 A * | 9/1998 | Hong | B62D 57/02 403/53 |
| 6,007,582 A * | 12/1999 | May | A61F 2/66 623/55 |
| 7,240,747 B2 | 7/2007 | Miyazaki et al. | |
| 9,358,137 B2 * | 6/2016 | Bedard | A61F 2/644 |
| 9,452,797 B2 * | 9/2016 | Kim | B62D 57/02 |
| 9,833,903 B1 * | 12/2017 | Kuffner | B25J 9/1679 |
| 2004/0064195 A1 * | 4/2004 | Herr | A61F 2/66 623/24 |
| 2005/0088131 A1 * | 4/2005 | Furuta | B25J 13/085 318/568.12 |

(Continued)

FOREIGN PATENT DOCUMENTS

CN 102556199 * 7/2012 ........... B62D 57/032

*Primary Examiner* — Joseph M Rocca
*Assistant Examiner* — Maurice L Williams
(74) *Attorney, Agent, or Firm* — Honigman Miller Schwartz and Cohn LLP

(57) ABSTRACT

Example embodiments relate to a foot for a walking robot. An example foot includes a central portion including a first surface and at least one foot extension including at least one respective first surface parallel to the first surface of the central portion. The foot additionally includes at least one hinge component that is configured to rotate the at least one foot extension away from the central portion when at least one respective second surface of the at least one foot extension is contacted. The foot also includes at least one spring component configured to cause the at least one hinge component to rotate the at least one foot extension toward the central portion until the at least one respective first surface is parallel to the first surface of the central portion when the at least one respective second surface is no longer contacted.

20 Claims, 9 Drawing Sheets

(56) References Cited

U.S. PATENT DOCUMENTS

| | | | |
|---|---|---|---|
| 2005/0216097 A1* | 9/2005 | Rifkin | A61F 2/60 623/53 |
| 2006/0249315 A1* | 11/2006 | Herr | A61F 2/60 180/8.1 |
| 2007/0043449 A1* | 2/2007 | Herr | A61F 2/60 623/24 |
| 2007/0061016 A1* | 3/2007 | Kuo | A61F 2/66 623/24 |
| 2007/0289786 A1* | 12/2007 | Cutkosky | B62D 57/024 180/8.6 |
| 2008/0245584 A1* | 10/2008 | Takenaka | B62D 57/032 180/8.1 |
| 2008/0297091 A1* | 12/2008 | Park | B25J 19/0091 318/568.12 |
| 2009/0200090 A1* | 8/2009 | Takanishi | B25J 19/0004 180/8.6 |
| 2010/0174385 A1* | 7/2010 | Casler | A61F 2/60 623/50 |
| 2010/0324699 A1* | 12/2010 | Herr | A61F 2/66 623/27 |
| 2011/0208322 A1* | 8/2011 | Rifkin | A61F 2/66 623/55 |
| 2012/0185052 A1* | 7/2012 | Lefeber | A61F 2/6607 623/18.11 |
| 2012/0277063 A1* | 11/2012 | Zhang | A61B 5/4595 482/8 |
| 2013/0006386 A1* | 1/2013 | Hansen | A61F 2/6607 623/24 |
| 2014/0259785 A1* | 9/2014 | Lester | A43B 13/026 36/102 |
| 2015/0142169 A1* | 5/2015 | Kim | A47L 11/282 700/245 |
| 2017/0007426 A1* | 1/2017 | Shin | A61F 2/60 |
| 2017/0043488 A1* | 2/2017 | Henry | B22C 9/22 |

\* cited by examiner

ROTATABLE EXTENSION FOR ROBOT FOOT

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

SUMMARY

The present application discloses implementations that relate to a foot for a walking robot. An example foot includes at least one rotatable foot extension which extends the surface area coverage of the foot when the foot is placed on the ground, which may provide improved stability for the robot. Additionally, a hinge component is provided to rotate a foot extension downward when the foot extension is contacted from the side and/or from above, which may help to prevent a robot from tipping over while walking. When the foot extension is no longer contacted, a spring component may return the foot extension to a horizontal position.

In one example, a foot for a robotic device is disclosed. The foot includes a central portion including a first surface. The foot further includes at least one foot extension including at least one respective first surface that is arranged parallel to the first surface of the central portion. The foot additionally includes at least one hinge component connecting the at least one foot extension to the central portion, where the at least one hinge component is configured to rotate the at least one foot extension away from the central portion when at least one respective second surface of the at least one foot extension is contacted. The foot also includes at least one spring component configured to cause the at least one hinge component to rotate the at least one foot extension toward the central portion until the at least one respective first surface of the at least one foot extension is parallel to the first surface of the central portion when the at least one respective second surface of the at least one foot extension is no longer contacted.

In another example, the present application describes a robotic device having at least two legs, where each leg has a foot. The foot includes a central portion including a first surface. The foot further includes at least one foot extension including at least one respective first surface that is arranged parallel to the first surface of the central portion. The foot additionally includes at least one hinge component connecting the at least one foot extension to the central portion, where the at least one hinge component is configured to rotate the at least one foot extension away from the central portion when at least one respective second surface of the at least one foot extension is contacted. The foot also includes at least one spring component configured to cause the at least one hinge component to rotate the at least one foot extension toward the central portion until the at least one respective first surface of the at least one foot extension is parallel to the first surface of the central portion when the at least one respective second surface of the at least one foot extension is no longer contacted.

In a further example, a method is described including causing a robotic device to walk on a ground surface by alternatively placing at least a first foot and a second foot on the ground surface, where each of the first foot and the second foot comprises a central portion including a first surface and at least one foot extension including at least one respective first surface that is arranged parallel to the first surface of the central portion such that the first surface of the central portion and the at least respective first surface of the at least one foot extension contact the ground surface. When a given foot of the first foot and the second foot is above the ground surface and at least one respective second surface of the at least one foot extension of the given foot is contacted, the method further includes rotating, by at least one hinge component of the given foot, the at least one foot extension of the given foot away from the central portion of the given foot. When the at least one respective second surface of the at least one foot extension of the given foot is no longer contacted, the method additionally includes rotating, by the at least one hinge component of the given foot, the at least one foot extension of the given foot back toward the central portion of the given foot to a position in which the first surface of the central portion of the given foot and the at least one respective first surface of the at least one foot extension are parallel.

In yet another example, the present application describes a system. The system includes a means for causing a robotic device to walk on a ground surface by alternatively placing at least a first foot and a second foot on the ground surface, where each of the first foot and the second foot comprises a central portion including a first surface and at least one foot extension including at least one respective first surface that is arranged parallel to the first surface of the central portion such that the first surface of the central portion and the at least respective first surface of the at least one foot extension contact the ground surface. When a given foot of the first foot and the second foot is above the ground surface and at least one respective second surface of the at least one foot extension of the given foot is contacted, the system further includes means for rotating, by at least one hinge component of the given foot, the at least one foot extension of the given foot away from the central portion of the given foot. When the at least one respective second surface of the at least one foot extension of the given foot is no longer contacted, the system additionally includes means for rotating, by the at least one hinge component of the given foot, the at least one foot extension of the given foot back toward the central portion of the given foot to a position in which the first surface of the central portion of the given foot and the at least one respective first surface of the at least one foot extension are parallel.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
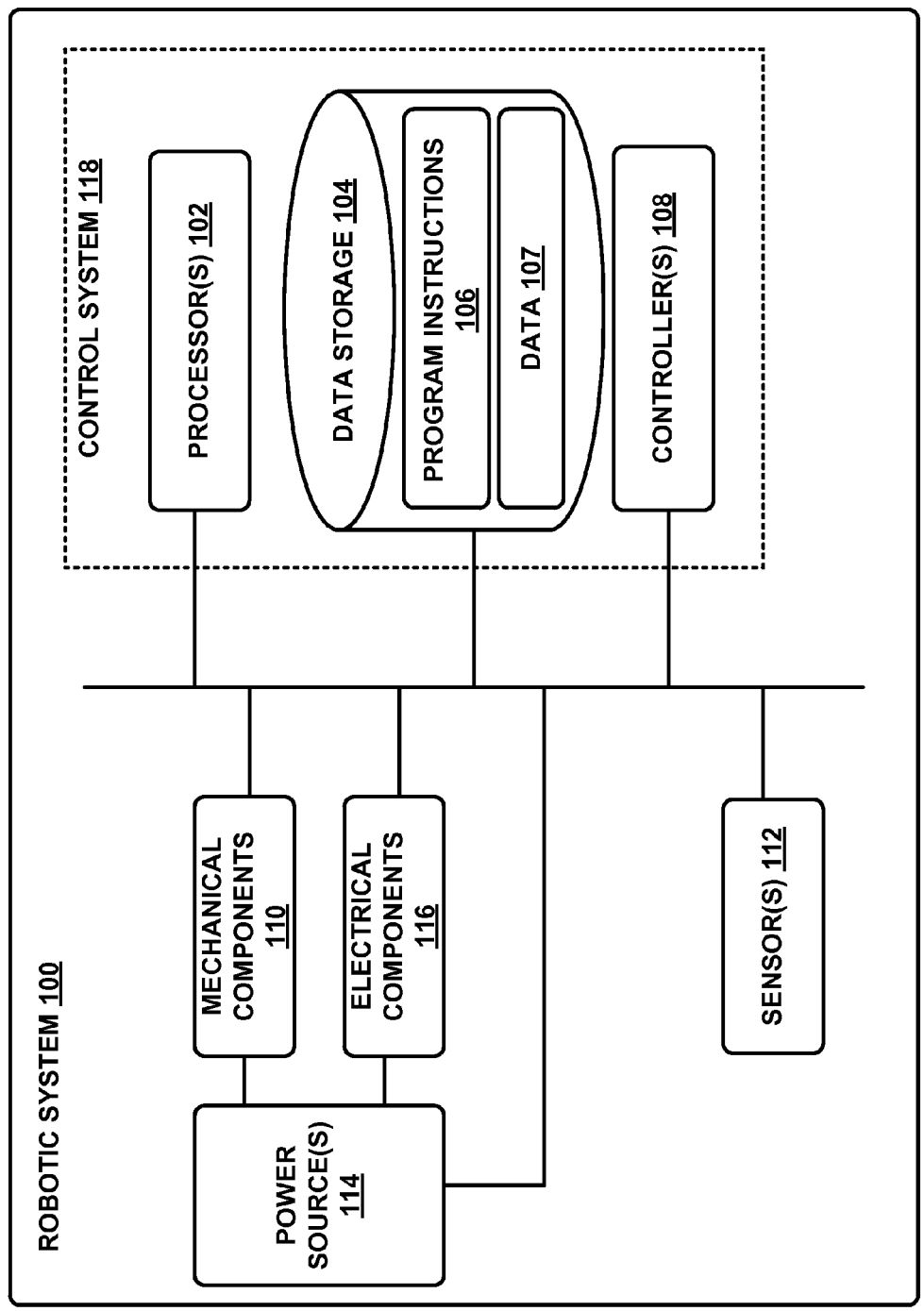
FIG. 1 illustrates a configuration of a robotic system, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

Example embodiments relate to a foot for a walking robot. Within examples, the foot includes at least one rotatable extension that may help to prevent the walking robot from tipping over when the foot collides with an obstacle, such as another part of the robot or an object in the environment. A foot extension piece may include a bottom surface that is arranged parallel to a bottom surface of a central portion of the foot. Accordingly, a foot extension may provide the robot with increased surface contact area when walking on a ground surface, which may provide increased stability as compared to a robot foot lacking the foot extension. However, the increased surface area of the bottom of the foot may also increase the probability of a collision when the robot swings the foot through the air while walking.

To compensate for possible collisions involving the foot of the robot, each foot extension piece may be connected to a central portion of the foot by a hinge component. The hinge component may be configured to rotate the corresponding foot extension downward when a top surface of the foot extension is contacted from the side and/or from above. When the foot extension is no longer being contacted, a spring component may rotate the foot extension back into a position in which the bottom surface of the foot extension is parallel to a bottom surface of the central portion of the foot. The hinge component may include an angle limiter to prevent the foot extension from rotating past this position.

In one example arrangement, a robot foot may include a central portion shaped as a rectangular prism with two foot extension attached to the central portion on opposing sides. Each foot extension may be shaped as a right triangular prism with three rectangular surfaces: a bottom surface to extend the contact area of the bottom of the foot, a perpendicular surface aligned parallel to and along a side of the central portion, and a slanted top surface. When the slanted top surface is contacted from the side and/or from above, the foot extension may rotate away from the central portion around a hinge component positioned near the bottom surface of the foot extension. The perpendicular surface may have the same (rectangular) shape as the side surface of the central portion so that the foot extension lines up with the central portion without protruding when in an unrotated position.

An example walking robotic device may include two feet, with each foot having an inner foot extension and an outer foot extension. The inner foot extension of each foot may be arranged along a side of the foot which faces the other leg of the robot when the robot is walking. Accordingly, the inner foot extension of a given foot may rotate downward if the given foot collides with the other leg to help prevent the robot from tipping over. The outer foot extension of each foot may be arranged along a side of the foot which faces away from the other leg when the robot is walking. Accordingly, the outer foot extension of a given foot may rotate downward if the given foot collides with an external obstacle, such as a step, to help prevent the robot from tipping over.

According to additional embodiments, one or more feet of a walking robot may only have a single foot extension. In other embodiments, one or more feet of a walking robot may have more than two foot extensions. For instance, a foot for a robot may have a foot extension positioned on each of four sides of a rectangular central portion. In further examples, a walking robot may have two feet, four feet, or a different number of feet. Individual feet of a walking robot may have different numbers, placements, and/or shapes of foot extensions in accordance with further examples as well.

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a biped robot, quadruped robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. The instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic device 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), and/or wheel(s). The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm or a leg to measure the load on the actuators that move one or more members of the arm or leg. As another example, the robotic system 100 may use one or more position sensors to sense the position of the actuators of the robotic system. For instance, such position sensors may sense states of extension, retraction, or rotation of the actuators on arms or legs.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, biped and quadruped implementations of the robotic system 100 are described below.

Figure 2:
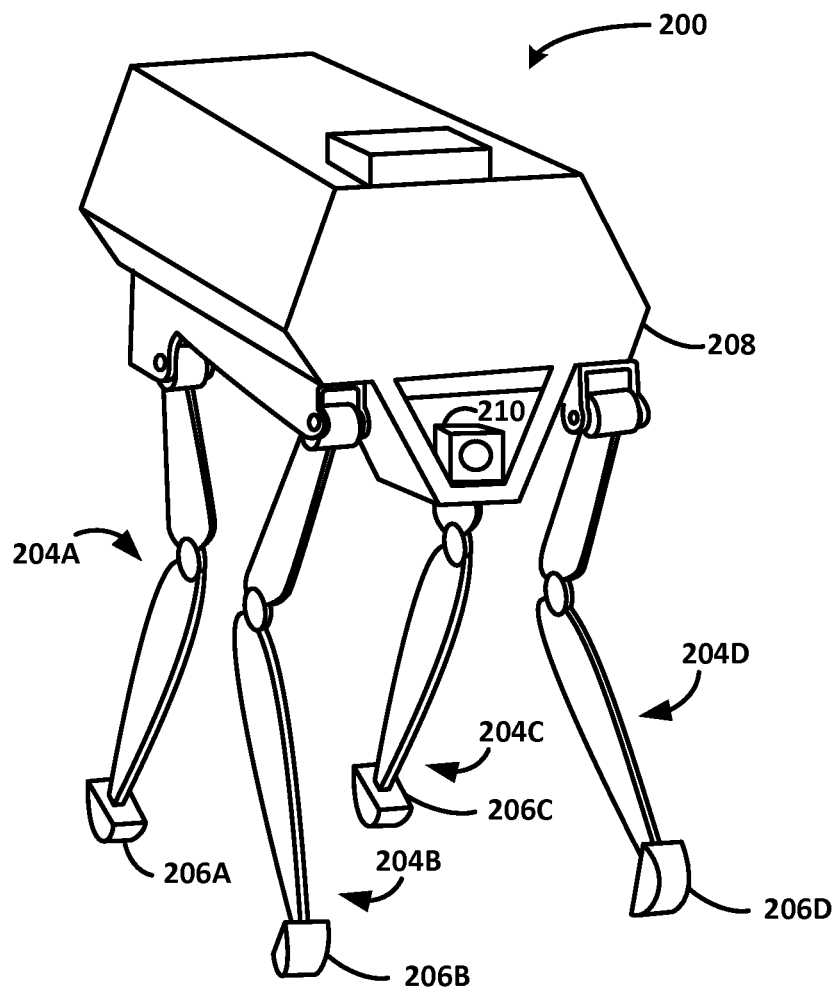
FIG. 2 illustrates a perspective view of a quadruped robot, according to an example embodiment.

FIG. 2 illustrates a quadruped robot 200, according to an example implementation. Among other possible features, the robot 200 may be configured to perform some of the operations described herein. The robot 200 includes a control system, and legs 204A, 204B, 204C, 204D connected to a body 208. Each leg may include a respective foot 206A, 206B, 206C, 206D that may contact a surface (e.g., a ground surface). Further, the robot 200 is illustrated with sensor(s) 210, and may be capable of carrying a load on the body 208. Within other examples, the robot 200 may include more or fewer components, and thus may include components not shown in FIG. 2.

The robot 200 may be a physical representation of the robotic system 100 shown in FIG. 1, or may be based on other configurations. Thus, the robot 200 may include one or more of mechanical components 110, sensor(s) 112, power source(s) 114, electrical components 116, and/or control system 118, among other possible components or systems.

The configuration, position, and/or structure of the legs 204A-204D may vary in example implementations. The legs 204A-204D enable the robot 200 to move relative to its environment, and may be configured to operate in multiple degrees of freedom to enable different techniques of travel.

In particular, the legs 204A-204D may enable the robot 200 to travel at various speeds according to the mechanics set forth within different gaits. The robot 200 may use one or more gaits to travel within an environment, which may involve selecting a gait based on speed, terrain, the need to maneuver, and/or energy efficiency.

Further, different types of robots may use different gaits due to variations in design. Although some gaits may have specific names (e.g., walk, trot, run, bound, gallop, etc.), the distinctions between gaits may overlap. The gaits may be classified based on footfall patterns—the locations on a surface for the placement the feet 206A-206D. Similarly, gaits may also be classified based on ambulatory mechanics.

The body 208 of the robot 200 connects to the legs 204A-204D and may house various components of the robot 200. For example, the body 208 may include or carry sensor(s) 210. These sensors may be any of the sensors discussed in the context of sensor(s) 112, such as a camera, LIDAR, or an infrared sensor. Further, the locations of sensor(s) 210 are not limited to those illustrated in FIG. 2. Thus, sensor(s) 210 may be positioned in various locations on the robot 200, such as on the body 208 and/or on one or more of the legs 204A-204D, among other examples.

Figure 3:
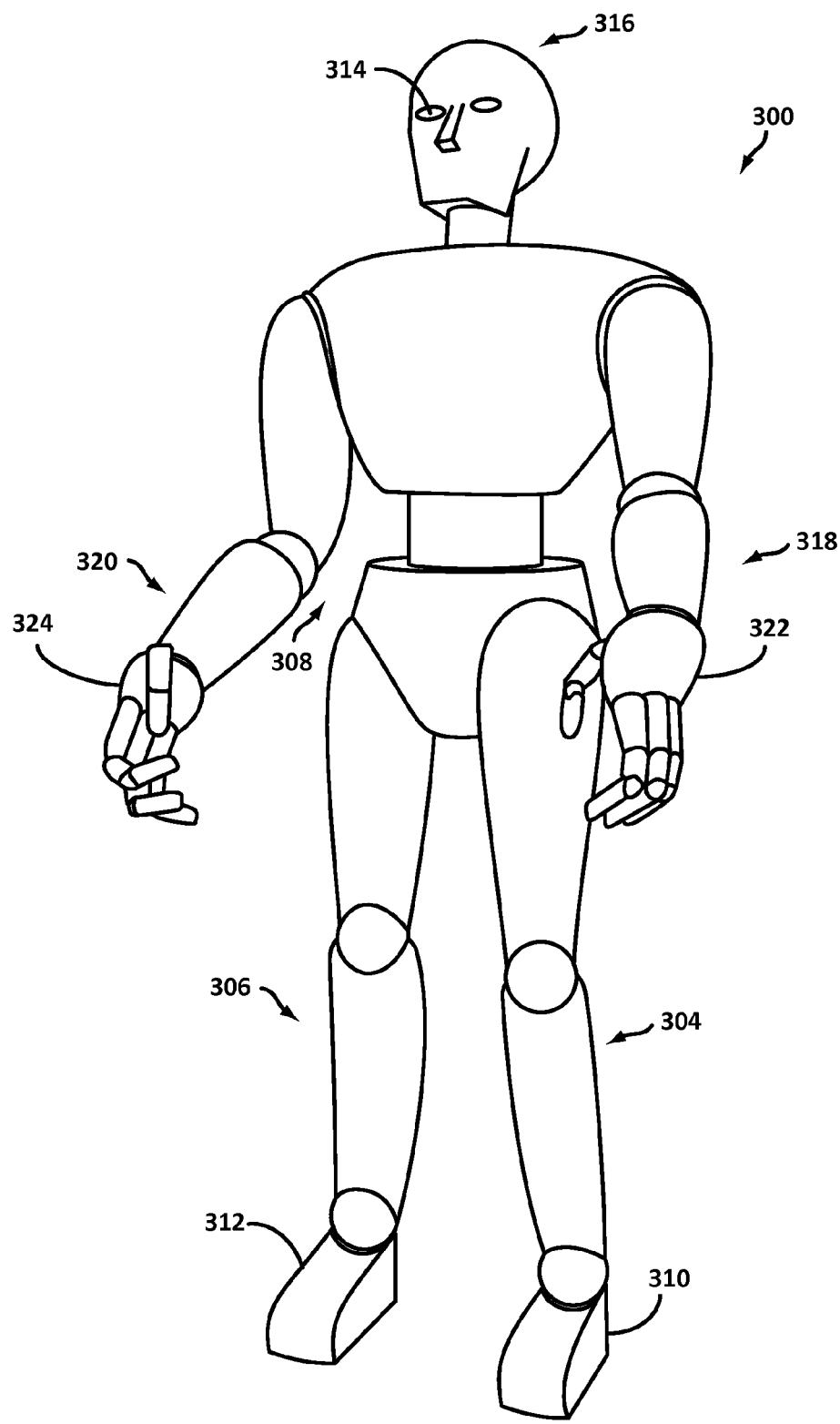
FIG. 3 illustrates a perspective view of a biped robot, according to an example embodiment.

FIG. 3 illustrates a biped robot 300 according to another example implementation. Similar to robot 200, the robot 300 may correspond to the robotic system 100 shown in FIG. 1, and may be configured to perform some of the implementations described herein. Thus, like the robot 200, the robot 300 may include one or more of mechanical components 110, sensor(s) 112, power source(s) 114, electrical components 116, and/or control system 118.

For example, the robot 300 may include legs 304 and 306 connected to a body 308. Each leg may consist of one or more members connected by joints and configured to operate with various degrees of freedom with respect to one another. Each leg may also include a respective foot 310 and 312, which may contact a surface (e.g., the ground surface). Like the robot 200, the legs 304 and 306 may enable the robot 300 to travel at various speeds according to the mechanics set forth within gaits. The robot 300, however, may utilize different gaits from that of the robot 200, due at least in part to the differences between biped and quadruped capabilities.

The robot 300 may also include arms 318 and 320. These arms may facilitate object manipulation, load carrying, and/or balancing for the robot 300. Like legs 304 and 306, each arm may consist of one or more members connected by joints and configured to operate with various degrees of freedom with respect to one another. Each arm may also include a respective hand 322 and 324. The robot 300 may use hands 322 and 324 for gripping, turning, pulling, and/or pushing objects. The hands 322 and 324 may include various types of appendages or attachments, such as fingers, grippers, welding tools, cutting tools, and so on.

The robot 300 may also include sensor(s) 314, corresponding to sensor(s) 112, and configured to provide sensor data to its control system. In some cases, the locations of these sensors may be chosen in order to suggest an anthropomorphic structure of the robot 300. Thus, as illustrated in FIG. 3, the robot 300 may contain vision sensors (e.g., cameras, infrared sensors, object sensors, range sensors, etc.) within its head 316.

Figure 4:
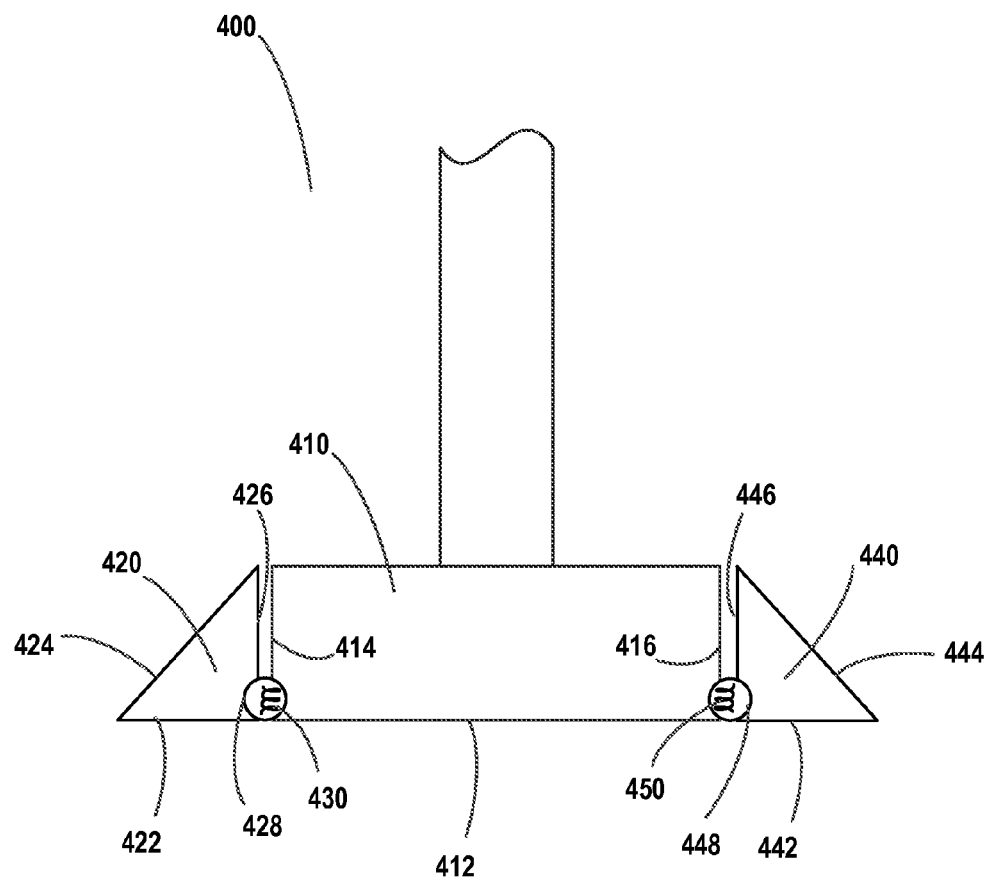
FIG. 4 illustrates a foot for a robot, according to an example embodiment.

FIG. 4 illustrates a front view of a foot for a robotic device, according to an example embodiment. More specifically, the foot 400 may include a central portion 410 and two opposing foot extension portions 420, 440. The central portion 410 is a part of the foot which connects to the leg of the robot, and may be shaped as a rectangular prism. The view illustrated in FIG. 4 shows the rectangular front surface of the rectangular prism. Each foot extension 420, 440 may be shaped as a right triangular prism with rectangular sides and a triangular front surface. The view illustrated in FIG. 4 shows the triangular front surface of each foot extension 420, 440.

Each foot extension 420, 440 may serve to extend the surface area covered by the foot 400 when the foot 400 contacts a ground surface. In particular, the central portion 410 has a rectangular bottom surface 412 for contacting the ground when a robot is walking. Foot extension 420 has a rectangular bottom surface 422 arranged parallel to the bottom surface 412 of the central portion 410 to extend surface area covered by the foot 400. Similarly, foot extension 440 has a rectangular bottom surface 442 arranged parallel to the bottom surface 412 of the central portion 410 to extend the surface area covered by the foot 400. In this configuration, the bottom surfaces of the foot extensions are substantially coplanar with the bottom surface of the central portion.

Each foot extension 420, 440 may be arranged along a side of the central portion 410 of the foot 400. In particular, foot extension 420 may have a rectangular surface 426 that is perpendicular to the bottom surface 422. The rectangular surface 426 may be arranged parallel to and alongside a rectangular side surface 414 of the central portion 410. In some examples, some space is left between the central portion 410 and the foot extension 420 when the foot extension 420 is in an unrotated position. In other examples, the central portion 410 and the foot extension 420 are physically touching along surface 426 and surface 414.

In some examples, the rectangular surface 426 of foot extension 420 may have the same dimensions as the rectangular side surface 414 of the central portion 410. In other examples, the dimensions may not be the same. For instance, the rectangular surface 426 of the foot extension 420 may have a shorter height than the rectangular side surface 414 of the central portion 410.

Rectangular surface 446 of foot extension 440 may similarly be perpendicular to bottom surface 442, and may be arranged parallel and alongside rectangular side surface 416 of central portion 410. In some examples, foot extension 440 may have the same dimensions as 420. In other examples, the dimensions may be different, for instance, depending on whether the foot extension typically faces towards or away from another foot of a robot when the robot is walking.

Each foot extension 420, 440 may have a top surface that when contacted, causes the foot extension 420, 440 to rotate away from the central portion 410. This rotation may help to prevent the robot from tipping over when the foot 400 is contacted from the side and/or from above when a robot is walking. Foot extension 420 has a rectangular top surface 424 arranged to be slanted as shown in FIG. 4. If any part of the surface 424 is contacted while the foot 400 is not on the ground, the foot extension 420 may be caused to rotate away from central portion 410. Similarly, if any part of the rectangular top surface 440 is contacted, the foot extension 440 may be caused to rotate away from the central portion 410.

In order to effectuate this rotation, each foot extension 420, 440 may be attached to the central portion 410 of the foot 400 by a respective hinge component 428, 448. In particular, hinge component 428 may connect foot extension 420 to central portion 410 near bottom surface 422 of foot extension 420 and bottom surface 412 of central portion 410. The hinge component 428 may be configured to rotate foot extension 420 around an axis that runs perpendicular to the front surfaces of central portion 410 and the foot extension 420 which are shown in FIG. 4. Similarly, hinge component 448 may connect foot extension 440 to central portion 410 near surfaces 442 and surface 412. The hinge component 448 may be configured to rotate foot extension 440 around another axis that runs perpendicular to the front surfaces of central portion 410 and the foot extension 440 (and parallel to the axis of rotation of hinge component 428).

Each hinge component 428, 448 is a mechanical bearing that connects a respective foot extension 420, 440 to the central portion 410 of the foot 400, and allows the respective foot extension 420, 440 to rotate relative to the central portion 410 about a fixed axis of rotation. Additionally, each hinge component 428, 448 may be configured to allow a limited angle of rotation of a respective foot extension 420, 440. For instance, hinge component 428 may be configured to allow foot extension 420 to rotate toward central portion 410 only up to a point where the bottom surface 422 of foot extension 420 is parallel to the bottom surface 412 of the central portion 410. Additionally, hinge component 428 may be configured to allow foot extension 420 to rotate up to a certain angle (e.g., 30 degrees, 60 degrees, or 90 degrees) away central portion 410 when top surface 424 of foot extension 420 is contacted.

Each hinge component 428, 448 may be configured to rotate a respective foot extension 420, 440, when the foot extension 420, 440 is contacted from the side and/or above to help prevent a robot from tipping over or otherwise disrupting the robot's walking pattern. For instance, if the top surface 444 of foot extension 440 is contacted, the foot extension 440 may be rotated by hinge component 448 away from central portion 410. When the top surface 444 of foot extension 440 is no longer being contacted, the foot extension 440 may be rotated back to the position shown in FIG. 4 before the foot 400 next contacts the ground surface. For this, a spring component 450 corresponding to the hinge component 448 may operate to return the hinge component 448 to a position in which the bottom surface 442 of foot extension 440 is parallel to the bottom surface 412 of central portion 410. Similarly, spring component 430 may be configured to cause hinge component 428 to keep foot extension 420 in a horizontal position when the foot extension 420 is not contacted.

Each spring component 430, 450 is an elastic object used to store mechanical energy. The springs 430, 450 may be constructed from spring steel or a different material. Each spring 430, 450 may stretch or compress as the corresponding foot extension 420, 440 is rotated away from the central portion 410. When the foot extension 420, 440 is no longer contacted, stored energy may be released as the stretched or compressed spring returns the foot extension 420, 440 to the horizontal position. In some examples, spring components 430, 450 may be integrated with hinge components 428, 448 as spring-loaded hinges. In other examples, spring components 430, 450 and hinge components 428, 448 may be physically separate components. Additionally, spring components 430, 450 may be relatively weak in terms of force exerted to prevent the spring from physically moving an obstacle encountered by the robot's foot.

The foot 400 may be constructed from a number of different materials, including metals, plastics, rubbers, etc. Individual components of the foot 400 may be constructed from different materials. The central portion 410 and foot extension pieces 420, 440 may be solid or hollow. Alternative shapes and/or dimensions may be used for the central portion 410 and/or foot extension pieces 420, 440 as well.

Figure 5:
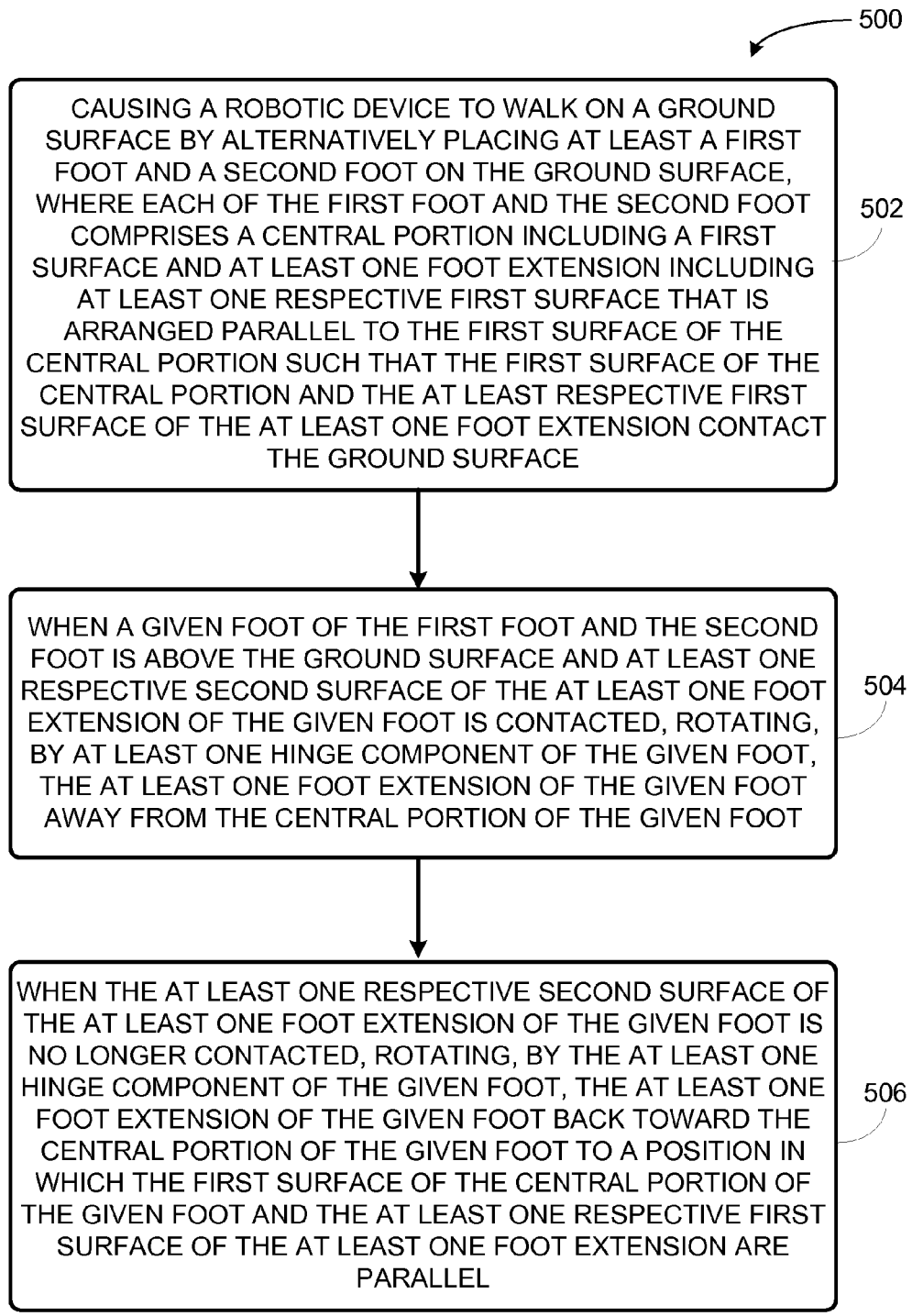
FIG. 5 is a block diagram of a method, according to an example embodiment.

FIG. 5 is a flowchart of an example method 500 for a robotic device walking on a ground surface, according to an example embodiment. Method 500 shown in FIG. 5 presents an embodiment of a method that could be used or implemented by the robot 200 of FIG. 2 and/or the robot 300 of FIG. 3, for example, or more generally by one or more components of any walking robot. Method 500 may include one or more operations, functions, or actions as illustrated by one or more blocks of 502-506. Although the blocks are illustrated in a sequential order, these blocks may also be performed in parallel, and/or in a different order than those described herein. Also, the various blocks may be combined into fewer blocks, divided into additional blocks, and/or removed based upon the directed implementation.

In addition, the method 500 and other processes and methods disclosed herein, the block diagram shows functionality and operation of one possible implementation of present embodiments. In this regard, each block may represent or involve a module, a segment, or a portion of program code, which includes one or more instructions executable by a processor or computing device for implementing specific logical operations or steps in the process. The program code may be stored on any type of computer-readable medium, for example, such as a storage device included a disk or hard drive. The computer-readable medium may include a non-transitory computer-readable medium, for example, such as computer-readable media that stores data for short periods of time like register memory, processor cache and/or random access memory (RAM). The computer-readable medium may also include non-transitory media, such as secondary or persistent long-term storage, like read-only memory (ROM), optical or magnetic disks, and compact-disc read-only memory (CD-ROM), for example. The computer-readable media may be considered a computer-readable storage medium, for example, or a tangible storage device.

In addition, for the method 500 and other processes, methods, and operations described herein, each block in FIG. 5 may represent circuitry that is wired to perform the specific logical operations in the process.

In one embodiment, some or all of the operations of the method 500 may be performed by a control system, such as control system 118 of FIG. 1. In other embodiments, some or all of the operations of method 500 may be distributed across multiple control systems that are interfaced with mechanical components and/or electrical components.

At block 502, the method 500 involves causing a robotic device to walk on a ground surface by alternatively placing at least a first foot and a second foot on the ground surface. One or more control systems located on the robotic device and/or remotely may control actuators to move the robot's feet as the robot navigates across a terrain. Each of the first foot and the second foot may have at least one foot extension piece, such as illustrated and described with respect to FIG. 4. In particular, each foot may have a central portion and at least one foot extension connected to the central portion. The bottom surface of the central portion and the bottom surface of each foot extension may be arranged parallel to each other and may all contact the ground surface as the robot steps on a foot. Accordingly, each foot extension may expand the surface area on the ground contacted by the foot of the robot as the robot is walking.

Figure 6A:
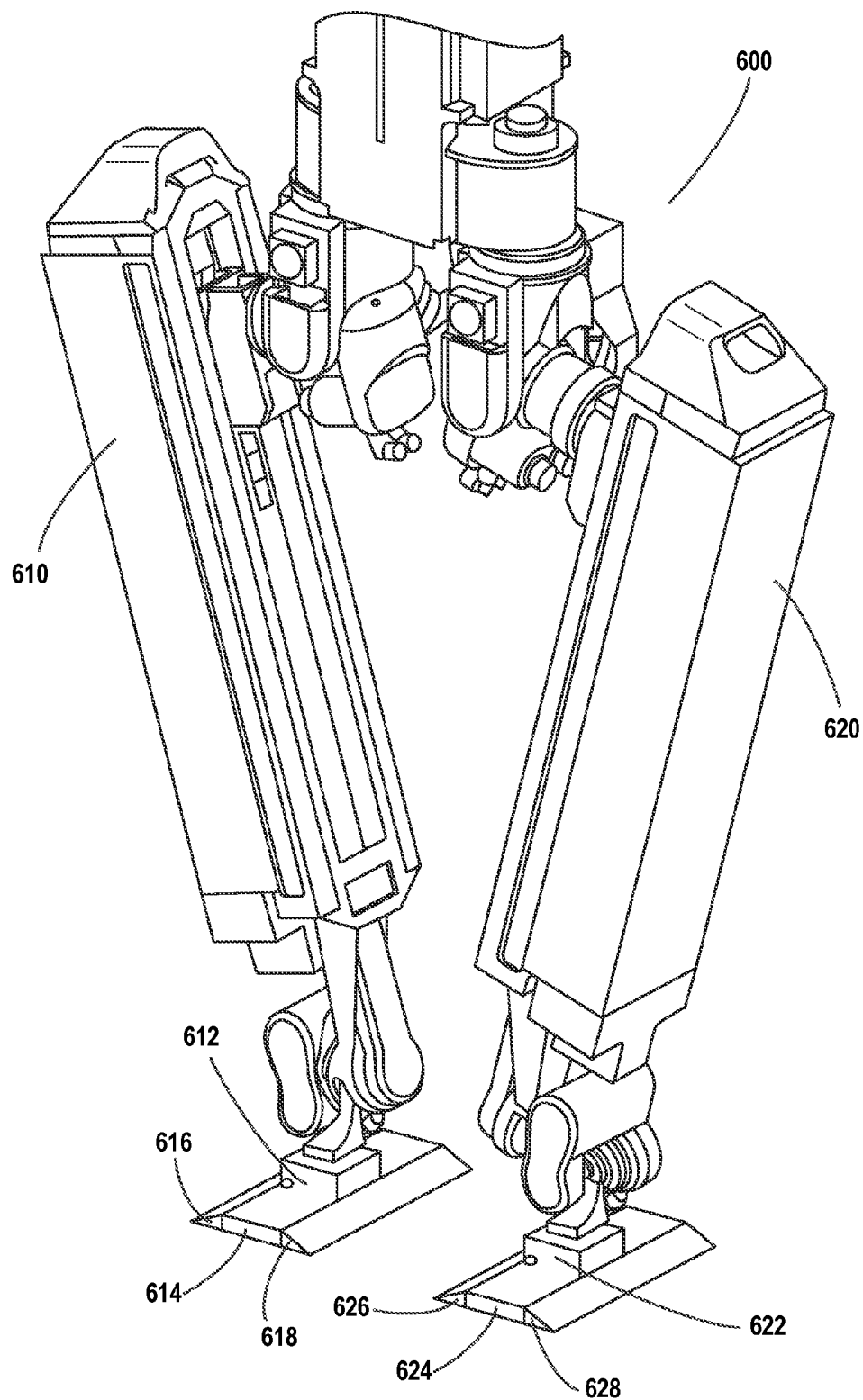
FIGS. 6A-6D illustrate movements of a walking robot, according to an example embodiment.

FIG. 6A illustrates a walking robot, according to an example embodiment. More specifically, robot 600 includes a first leg 610 with a first foot 612 and a second leg 620 with a second foot 622. Each foot 612, 622 includes two opposing foot extensions. In particular, foot 612 includes a central portion 614 and opposing foot extension pieces 616, 618. Foot 622 includes a central portion 624 and opposing foot extension pieces 626, 628.

The robot 600 may be controlled to walk across a ground surface by alternatively moving legs 610, 620 to alternate placements of foot 612 and foot 622 on the ground surface. In some examples, the robot 600 may be capable of movement in several different directions (e.g., forwards, backwards, sideways). Movements of the feet 612, 622 may be planned so as to not cause collisions between the feet 612, 622 and other parts of the robot 600 or obstacles in the environment. Accordingly, the robot 600 may execute a walking sequence which benefits from the increased surface area provided by the foot extension pieces 616, 618 and 626, 628. In particular, when foot 612 contacts the ground surface as the robot is walking, the bottom surface of each of the central portion 614, foot extension 616, and foot extension 618 may contact the ground surface. Similarly, when foot 622 contacts the ground surface, the bottom surface of each of the central portion 624, foot extension 626, and foot extension 628 may contact the ground surface. In this configuration, the bottom surfaces of the foot extensions are substantially coplanar with the bottom surface of the central portion.

Referring back to FIG. 5, method 500 may further involve rotating at least one foot extension of a given foot of the robotic device away from the central portion of the given foot, as shown by block 504. More specifically, when a given foot of the robot is above the ground surface as the robot is walking, a foot extension of the given foot may be contacted from the side and/or from above. For instance, the foot extension may contact another part of the robot, such as the other leg, or an obstacle in the environment such as a step. In some examples, this contact may be unexpected by the robot's control system, but may occur as a result of uncontrollable variables, such as environmental factors. In other examples, the contact may be expected by the robot's control system.

When a particular foot of the robot is swinging through the air and an extension piece of the particular foot is contacted from the side and/or above, a hinge component may rotate the extension piece away from the central portion of the foot. Such rotation may help to prevent the contact from disrupting the robot's walking pattern and/or causing the robot to tip over while walking.

Figure 6B:
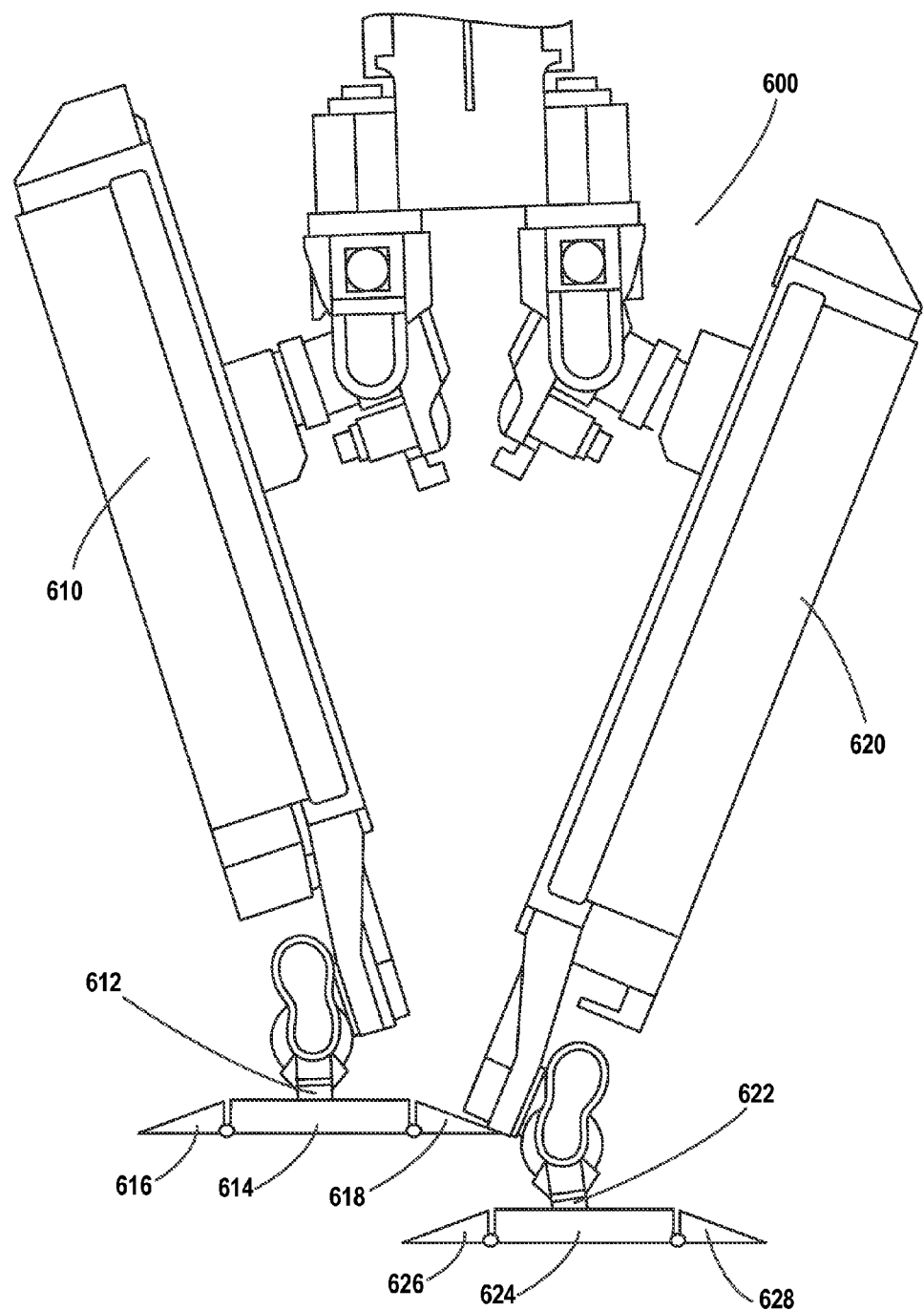

FIG. 6B shows a front view illustrating contact between a foot of a robot and the opposing leg, according to an example embodiment. More specifically, as the robot 600 is walking by alternating placements of foot 612 and 622 on the ground, contact may occur between the foot 612 and the leg 620, for instance, as a result of foot 622 landing at an unexpected angle on the ground. The increased surface area of foot 612 resulting from foot extensions 616, 618 may provide increased stability for the robot 600 when the robot is standing on foot 612, but may also increase the risk of a collision involving foot 612. In the situation illustrated by FIG. 6B, if foot extension 618 is not allowed to rotate downward as the robot 600 lifts leg 610, the robot 600 may be caused to trip while walking.

Figure 6C:
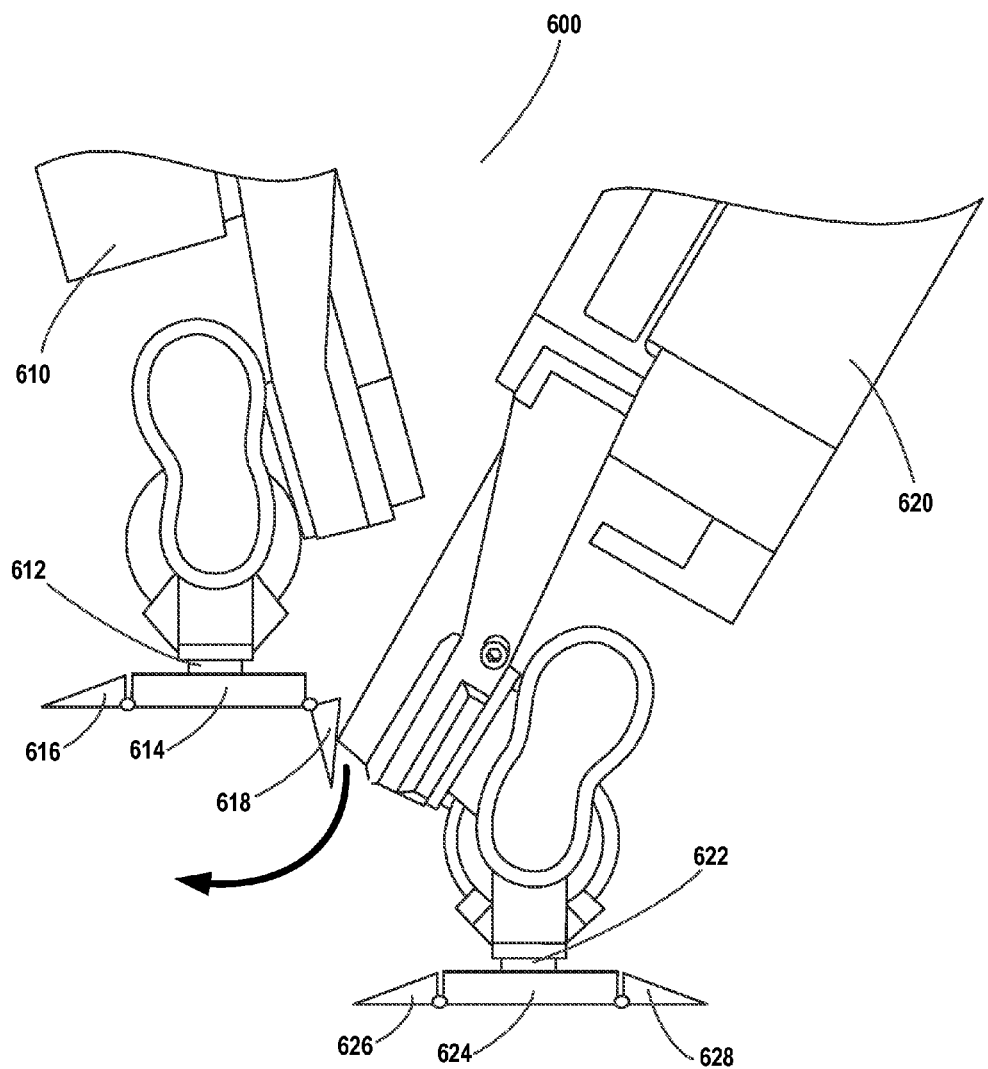

FIG. 6C shows a front view illustrating rotation of a foot extension of a foot of a robot, according to an example embodiment. More specifically, as the robot 600 is controlled to raise and/or otherwise move leg 610 such that foot extension 618 is contacted from above by leg 620, a hinge component of foot 612 may rotate foot extension 618 downward. The arrow in FIG. 6C illustrates the direction of rotation of foot extension 618 by the hinge component. This rotational movement may allow the foot 612 to clear the leg 620 without disrupting movement of the leg 610 and/or causing the robot 600 to tip over.

In some examples, when a foot extension part 618 is caused to be rotated as a result of contact to the foot extension part 618, a control system of the robot 600 may be notified (e.g., based on one or more sensors on the foot 612 or foot extension 618). The control system of the robot 600 may adjust the path of movement of the leg 610 and/or the foot 612 to avoid contact between other parts of the leg 610 or foot 612 and the opposing leg 620. In this manner, rotation of the foot extension 618 may serve as a warning signal indicating that the foot 612 has contacted the leg 620. The control system may also use this warning signal to adjust the gait of the robot for future steps as well or instead.

As shown in FIGS. 6A, 6B, and 6C, the feet 612, 622 of the robot 600 may be aligned relative to one another such that one extension piece of each foot faces the opposing leg and one extension piece of each foot faces away from the opposing leg. In particular, foot 612 may have an inner extension piece 618 along a side of the foot 612 which is generally oriented in the direction of leg 620 (regardless of the direction that the robot 600 is walking). Inner extension piece 618 may be rotated away from central portion 614 primarily as a result of contact with opposing leg 620. Additionally, foot 612 may have an outer extension piece 616 along a side of the foot 612 which is generally oriented away from leg 620. Outer extension piece 616 may be rotated away from central portion 614 primarily as a result of contact with an external obstacle, such as a step when the robot 600 is walking sideways up a set of steps. Similarly, foot 622 may also have an inner extension piece 626 and an outer extension piece 628.

Referring back to FIG. 5, method 500 further involves rotating the at least one foot extension of the given foot back toward the central portion of the foot, as shown by block 506. More specifically, when the top surface of the foot extension is no longer being contacted, the hinge component of the foot may rotate the foot extension back to a position in which the bottom surface of the foot extension is parallel to the bottom surface of the central portion of the foot. The bottom surface of the foot extension may then be in a position to contact the ground surface when the robot next steps on the ground with the given foot.

In some examples, the rotation by a foot extension back to the horizontal position may be achieved by a spring mechanism which acts on the hinge component. In particular, the spring mechanism may rotate the foot extension toward the central portion of the foot until the bottom surface of the foot extension and the bottom surface of the central portion are parallel. In the further examples, the hinge component may include an angle limiter which prevents the foot extension from rotating past the horizontal position. In some examples, a control system of the robot may be notified (e.g., by one or more sensors on the foot or foot extension) that the foot extension has returned to a horizontal position and is ready to be placed on the ground surface.

Figure 6D:
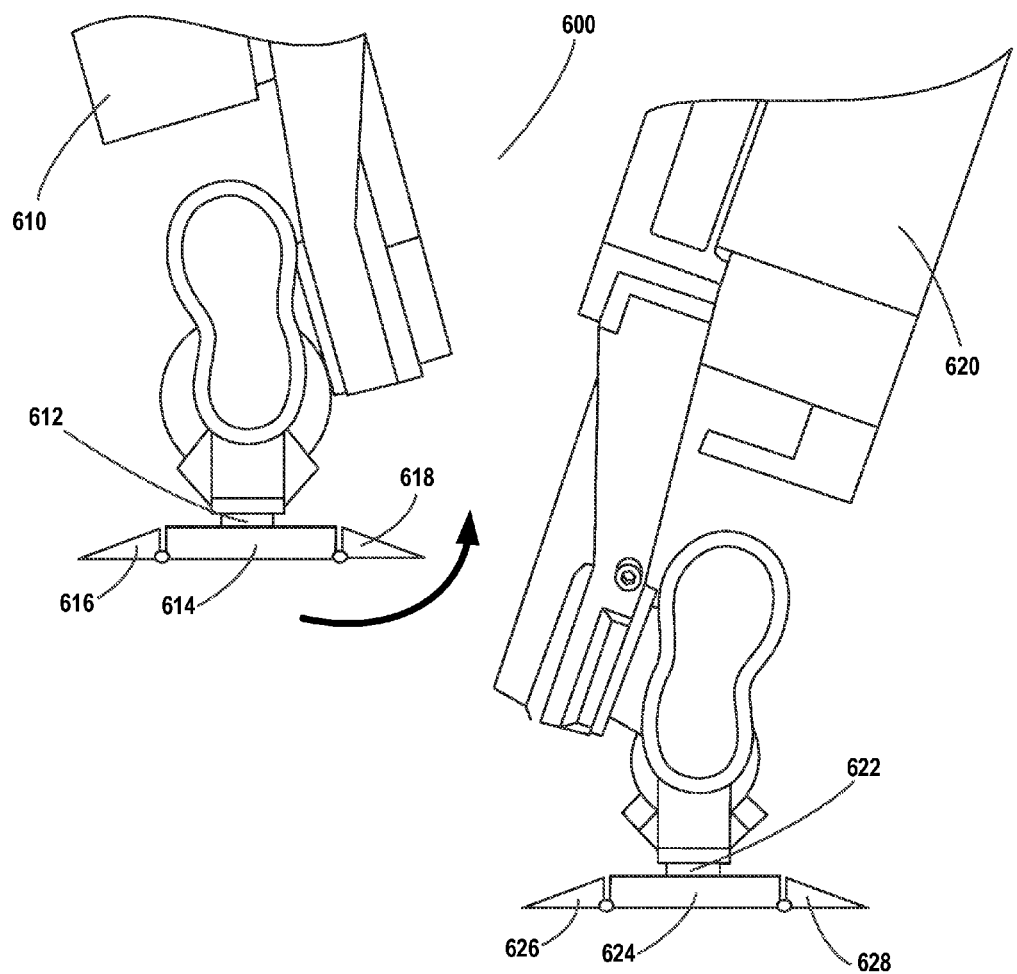

FIG. 6D shows a front view of rotation of a foot extension of a foot of a robot back toward the central portion of the foot, according to an example embodiment. More specifically, when the foot extension piece 618 of foot 612 is no longer being contacted by the leg 620, the hinge mechanism of foot 612 corresponding to foot extension 618 may rotate the foot extension 618 back to a horizontal position. The arrow shown in FIG. 6D illustrates the direction of rotation of foot extension 618. This rotation may be caused by a spring mechanism which acts on the hinge mechanism of foot 612 corresponding to foot extension 618. In particular, the spring mechanism may be a relatively weak spring which holds the foot extension 618 in the horizontal position illustrated by FIG. 6D when no superseding force is applied to foot extension 618. Once the foot extension 618 has been rotated back to the horizontal position, the foot 612 may then be placed on the ground as the robot takes another step.

In alternative examples, the rotation by a foot extension back to the horizontal position may be achieved by other mechanisms. For instance, a control system may detect and measure downward rotation of the foot extension. When the foot extension is no longer being contacted, the control system may operate an actuator which reverses the detected and measured amount of rotation. Other means of rotating a foot extension piece may also be used.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A foot for a robotic device, the foot comprising:
   a central portion including a ground-contacting surface, a top surface disposed on an opposite side of the central portion than the ground-contacting surface and opposing a leg of the robotic device, and a first side surface extending between the ground-contacting surface and the top surface;
   a first foot extension configured to rotate relative to the central portion between a first horizontal position and a rotated position, the first foot extension including a respective ground-contacting surface and a respective top surface, the ground-contacting surface of the first foot extension substantially coplanar with the ground-contacting surface of the central portion when the first foot extension is in the first horizontal position;
   a first hinge component rotatably coupling the first foot extension to the first side surface of the central portion, the first hinge component configured to rotate the first foot extension from the first horizontal position toward the rotated position when the top surface of the first foot extension is in contact with an obstacle, the first foot extension rotating away from the top surface of the central portion as the first foot extension rotates from the first horizontal position toward the rotated position; and
   a first spring component configured to cause the first hinge component to rotate the first foot extension back to the first horizontal position when the top surface of the first foot extension is no longer in contact with the obstacle.

2. The foot of claim 1, further comprising:
   a second foot extension configured to rotate relative to the central portion between a second horizontal position and a rotatable position, the second foot extension including a respective ground-contacting surface and a respective top surface, the ground-contacting surface of the second foot extension substantially coplanar with the ground-contacting surface of the central portion when the second foot extension is in the second horizontal position; and
   a second hinge component rotatably coupling the second foot extension to a second side surface of the central portion, the second side surface disposed on an opposite side of the central portion than the first side surface and extending between the ground-contacting surface of the central portion and the top surface of the central portion, wherein the second hinge component is configured to rotate the second foot extension from the second horizontal position toward the rotatable position when the top surface of the second foot extension is in contact with an obstacle, the second foot extension rotating away from the top surface of the central portion as the second foot extension rotates from the second horizontal position toward the rotatable position.

3. The foot of claim 2, wherein the first foot extension and the second foot extension have a same shape.

4. The foot of claim 1, wherein the central portion comprises a rectangular prism.

5. The foot of claim 4, wherein the first foot extension comprises at least one right triangular prism having a respective side surface perpendicular to the respective ground-contacting surface, wherein the respective side surface is arranged parallel to and alongside first side surface of the central portion.

6. The foot of claim 5, wherein the first foot extension comprises a first right triangular prism connected to the first side surface of the central portion and a second right triangular prism connected to a second side surface of the central portion, wherein the second side surface of the central portion is opposite the first side surface of the central portion.

7. The foot of claim 5, wherein the respective side surface of the first foot extension and the first side surface of the central portion have a same rectangular shape.

8. The foot of claim 1, wherein the first hinge component comprises at least one angle limiter configured to prevent the first foot extension from rotating past the first horizontal position when the top surface of the first foot extension is no longer in contact with the obstacle.

9. The foot of claim 1, wherein the first hinge component connects the ground-contacting surface of the first foot extension to the ground-contacting surface of the central portion.

10. A robotic device, comprising:
at least two legs, wherein each leg has a foot comprising:
a central portion including a ground-contacting surface, a top surface disposed on an opposite side of the central portion than the ground-contacting surface and opposing a leg of the robotic device, and a first side surface extending between the ground-contacting surface and the top surface;
a first foot extension configured to rotate relative to the central portion between a horizontal position and a rotated position, the first foot extension including a respective ground-contacting surface and a respective tot surface, the ground-contacting surface of the first foot extension substantially coplanar with the ground-contacting surface of the central portion when the first foot extension is in the horizontal position;
a first hinge component rotatably coupling the first foot extension to the first side surface of the central portion, the first hinge component configured to rotate the first foot extension from the horizontal position toward the rotated position when the top surface of the first foot extension is in contact with an obstacle, the first foot extension rotating away from the top surface of the central portion as the first foot extension rotates from the horizontal position toward the rotated position; and
a first spring component configured to cause the first hinge component to rotate the first foot extension back to the horizontal position when the top surface of the first foot extension is no longer in contact with the obstacle.

11. The robotic device of claim 10, wherein:
the at least two legs comprise a first leg having a first foot and a second leg having a second foot;
the first foot extension of the first foot comprises an inner foot extension connected to the central portion of the first foot along the first side surface of the central portion of the first foot, the first side surface of the central portion of the first foot facing the second foot; and
the first foot extension of the second foot comprises an inner foot extension connected to the central portion of the second foot along the first side surface of the central portion of the second foot, the first side surface of the central portion of the second foot facing the first foot.

12. The robotic device of claim 11, wherein the inner foot extension of the first foot and the inner foot extension of the second foot each comprise a right triangular prism.

13. The robotic device of claim 11, further comprising:
a second foot extension of the first foot comprising an outer foot extension connected to the central portion of the first foot along a second side surface of the central portion of the first foot, the second side surface of the central portion of the first foot facing away from the second foot; and
a second foot extension of the second foot comprising an outer foot extension connected to the central portion of the second foot along a second side surface of the central portion of the second foot, the second side surface of the central portion of the second foot facing away from the first foot.

14. The robotic device of claim 13, wherein the outer foot extension of the first foot and the outer foot extension of the second foot each comprise a right triangular prism.

15. The robotic device of claim 10, further comprising a second foot extension connected to a second side surface of the central portion of a given foot, wherein the second side surface of the central portion of the given foot is opposite the first side surface.

16. The robotic device of claim 15, wherein the first foot extension of the given foot and the second foot extension of the given foot have a same shape.

17. A method comprising:
causing a robotic device to walk on a ground surface by alternatively placing at least a first foot and a second foot on the ground surface, wherein each of the first foot and the second foot comprises:
a central portion including a ground-contacting surface, a top surface disposed on an opposite side of the central portion than the ground-contacting surface and opposing a leg of the robotic device, and a first side surface extending between the ground-contacting surface and the top surface; and
a first foot extension configured to rotate relative to the central portion between a horizontal position and a rotated position, the first foot extension including a respective ground-contacting surface and a respective top surface, the ground-contacting surface of the first foot extension substantially coplanar with the ground-contacting surface of the central portion when the first foot extension is in the horizontal position;
when a given foot of the first foot or the second foot is above the ground surface and the top surface of the first foot extension of the given foot is in contact with an obstacle, rotating, by a first hinge component of the given foot, the first foot extension of the given foot from the horizontal position toward the rotated position, the first foot extension of the given foot rotating away from the top surface of the central portion as the first foot extension of the given foot rotates from the horizontal position toward the rotated position; and when the top surface of the first foot extension of the given foot is no longer in contact with the obstacle, rotating, by the first hinge component of the given foot, the first foot extension of the given foot back to the horizontal position.

18. The method of claim 17, wherein rotating the first foot extension of the given foot back to the horizontal position comprises causing a spring component of the given foot to rotate the first hinge component.

19. The method of claim 18, wherein the first hinge component comprises at least one angle limiter configured to prevent the first foot extension of the given foot from rotating past the horizontal position.

20. The method of claim 17, wherein:
the first foot is attached to a first leg of the robotic device and the second foot is attached to a second leg of the robotic device;
the first foot extension of the first foot comprises an inner foot extension connected to the first side surface of the central portion of the first foot, the first side surface of the central portion of the first foot facing the second foot; and
the first foot extension of the second foot comprises an inner foot extension connected to the first side surface of the central portion of the second foot, the first side surface of the central portion of the second foot facing the first foot.

* * * * *